United States Patent [19]  [11] Patent Number: 4,937,311
Dujardin et al.  [45] Date of Patent: Jun. 26, 1990

[54] AROMATIC POLYESTERS AND POLYESTER CARBONATES CONTAINING TERMINAL ARALKYLPHENYL GROUPS, THEIR PRODUCTION AND USE

[76] Inventors: Ralf Dujardin, Bayer Aktiengesellschaft, P.O. Box 166, D 4150 Krefeld-Uerdingen; Rolf-Volker Meyer, Bayer Aktiengesellschaft, D 5090 Leverkusen, Bayerwerk, both of Fed. Rep. of Germany

[21] Appl. No.: 336,692

[22] Filed: Apr. 12, 1989

[30] Foreign Application Priority Data

Apr. 30, 1988 [DE] Fed. Rep. of Germany ....... 3814729

[51] Int. Cl.$^5$ .............................................. C08G 63/18
[52] U.S. Cl. ....................................... 528/179; 528/176
[58] Field of Search ................................ 528/176, 179

[56] References Cited
U.S. PATENT DOCUMENTS 4,330,663  5/1982  Rosenquist ........................... 528/176
4,438,255  3/1984  Rosenquist ........................... 528/176

Primary Examiner—Harold D. Anderson
Assistant Examiner—T. Mosley

[57] ABSTRACT

The new aromatic thermoplastic polyesters and polyester carbonates based on diphenols, dicarboxylic acids, chain terminators and, optionally, branching agents, which are characterized in that the chain terminators correspond to the following formula

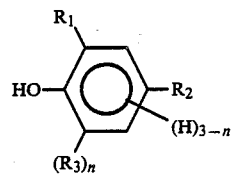

in which
$R_1$, $R_2$ and $R_3$ may be the same or different and represent $C_2$–$C_{12}$ alkyl or $C_8$–$C_{20}$ aralkyl and at least one of the substituents $R_1$ or $R_2$ is a $C_8$–$C_{20}$ aralkyl radical and
n has a value of 0.5 to 1, are suitable for the production of moldings, films, fibers and filaments. The polyesters and polyester carbonates are distinguished by good thermal stability.

3 Claims, No Drawings

AROMATIC POLYESTERS AND POLYESTER CARBONATES CONTAINING TERMINAL ARALKYLPHENYL GROUPS, THEIR PRODUCTION AND USE

Aromatic polyesters and polyester carbonates are known (W. M. Eareckson, J. Polym. Sci. XL, 399–406 (1959); Andre Conix "Thermoplastic Polyesters from Bisphenols", Ind. Eng. Chem., Vol. 51, no. 2, 147–150, February 1959; FR 1 177 517, U.S. Pat. No. 3,351,624, DE-AS 1 445 384; G. S. Kolesnikow et al., J. Polym. Sci. USSR, Vol. 9, 1967, pages 1705 to 1711; U.S. Pat. Nos. 2,030,331, 3,169,121, 3,409,704; DE-OS 2 714 544, 2 758 030).

The aromatic polyesters are amorphous thermoplasts which are prepared by polycondensation from bisphenols and aromatic dicarboxylic acid derivatives. Their property spectrum is similar to that of the polycarbonates, although their heat resistance is better. This similarity is even more pronounced in the case of the polyester carbonates because their molecular chains are made up of ester and carbonate structures. The need for polycarbonates to be terminated by certain terminal groups has long been known. Non-terminated polycarbonates generally show inadequate thermal stability because the free phenolic terminal groups of non-terminated polycarbonates represent reactive centers for the degradation of the polymers.

In view of the similarity of the aromatic polyesters and polyester carbonates to the polycarbonates, termination is essential in their case also.

The terminating agents are normally added during the actual synthesis of the polyesters or polyester carbonates and, by virtue of their chemical structure, should be capable of terminating chain growth. Accordingly, terminating agents of the type in question are also known as chain terminators and are used to regulate the molecular weight of aromatic polyesters and polyesters carbonates. Known and commercially used terminating agents are, primarily, monofunctional phenolic compounds, such as for example phenol, p-tert.-butylphenol and p-isooctylphenol.

The use of alkylphenols as terminal groups for aromatic polyesters is described, for example, in DE-OS No. 29 40 024. European patents Nos. 0 036 080 and 0 088 322 describe monosubstituted alkylphenols and chlorocarbonic acid esters thereof as terminal groups for aromatic polyester carbonates. European patent No. 0 008 492 and U.S. Pat. Nos. 4,438, 255 and 4,330,663 describe other chain terminators, such as dimethylphenols, aliphatic and aromatic carboxylic acid chlorides.

It has now surprisingly been found that sterically hindered phenols, i.e. in particular those containing particular substituents in the 2-, 4- and 6-position, not only may be effectively used as terminating agents for polyester and polyester carbonate chains, the corresponding products are also distinguished by advantageous property changes.

Accordingly, the present invention relates to aromatic polyesters and polyester carbonates having average molecular weights ($\overline{Mn}$) in the range from 5000 to 100,000 and preferably in the range from 7500 to 25,000 based on diphenols, dicarboxylic acids, chain terminators and, optionally, branching agents, characterized in that the chain terminators correspond to formula (I)

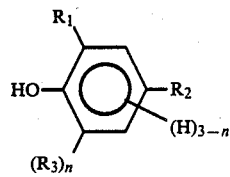

in which

R$_1$, R$_2$ and R$_3$ may be the same or different and represent C$_2$–C$_{12}$ alkyl or C$_8$–C$_{20}$ aralkyl, aryl (Ar) preferably standing for phenyl, diphenyl or naphthyl, and in which at least one of the substituents R$_1$ or R$_2$ is a C$_8$–C$_{20}$ aralkyl radical, and n has a value of from 0.5 to 1 and preferably from 0.6 to 0.9.

The chain terminators corresponding to formula (I) are a mixture of 2,4- and 2,4,6-alkylation products of phenols and may be used both as individual compounds (n=1) and also in admixture with one another. They are either known from the literature or may be obtained by methods known from the literature, for example by alkylation of phenols (see for example K. D. Bode in Houben-Weyl, "Methoden der organischen Chemie", Vol. 6/1c, Phenole, Part 2, pages 925 et seq., Thieme-Verlag 1976).

Suitable chain terminators are, for example, reaction products of phenol and styrene, phenol and α-methyl styrene, phenol and p-methyl styrene p-isooctylphenol and styrene, mixtures of dodecylphenol with styrene, phenol with styrene and ethylene and phenol with isobutene and styrene.

The following, at least 50% trisubstituted chain terminators obtained from 2,4-bis- and 2,4,6-tris-(1-phenylethyl)-phenol; 2,4-bis- and 2,4,6-tris-(1-methyl-phenylethyl)-phenol, are mentioned by way of example: 4-dodecyl-2-(1-phenylethyl)-and4-dodecyl-2,6-bis-(1-phenyl-ethyl)-phenol; 4-isobutyl-2-(1-phenylethyl)- and 4-isobutyl-2,6-bis-(1-phenylethyl)-phenol; 2-isobutyl-4-(1-phenylethyl)- and 2-isobutyl-4,6-bis-(1-phenylethyl)-phenol; 2,4-bis- and 2,4,6-tris-[1-(4-methylphenyl)-ethyl]phenol, preferably mixtures of 2,4-bis- and 2,4,6-tris-(1-phenylethyl)-phenol; 2,4-bis- and 2,4,6-tris-(1-methyl-1-phenylethyl)-phenol; 4-dodecyl-2-(1-phenylethyl)- and 4-dodecyl-2,6-bis-(1-phenylethyl)-phenol; 4-isobutyl-2-(1-phenylethyl)- and 4-isobutyl-2,6-bis-(1-phenylethyl)phenol.

The average molecular weight of the technical arylalkylphenol mixtures of general formula (I) used is determined by determination of the OH value (OHV) by known methods. The OH value is a mass value which indicates how many milligrams potassium hydroxide are equivalent to the quantity of acetic acid which is bound by 1 g substance during acetylation. The OH value is determined by the generally known methods described by E. Schröder, G. Müller and K. F Arndt in "Leitfaden der Polymercharakterisierung", pages 23 et seq (Akademie Verlag Berlin 1982).

Accordingly, the average molecular weight (MW) of the technical mixtures of general formula (I) used is determined in accordance with the following generally known equation:

$$\overline{MW} = \frac{5.6 \times 10^4}{OH\ value} \ (g \times mol^{-1})$$

The OH value of the arylalkylphenol mixtures of general formula (I) used is in the range from 67 to 248 and preferably in the range from 100 to 185. Average molecular weights of the compounds of from 226 to 836 g/mol and preferably from 303 to 560 g/mol correspond to the OH values mentioned above.

The quantity of chain terminators corresponding to formula (I) required to adjust the molecular weights $\overline{M}n$ of the polymers according to the invention to a value of from 5000 g/mol to 100,000 g/mol is normally between about 0.5 mol-% and 10 mol-% and preferably between 2 mol-% and 7 mol-%, based on the mols diphenol used.

Where branching agents, i.e. trifunctional or more than trifunctional compounds, are additionally used in the usual quantities of from 0.05 mol-% to 2 mol-%, based on the mols diphenyl used, the quantity of chain terminators corresponding to formula (I) is between about 0.5 and 10 mol-% and preferably between 3 and 6 mol-%.

The present invention also relates to a process for the production of aromatic polyesters and aromatic polyester carbonates having molecular weights $\overline{M}n$ (number average, as determined by gel chromatography after preliminary calibration) of at least 5000 g/mol, preferably in the range from 7500 g/mol to 100,000 g/mol and more preferably in the range from 9000 g/mol to 25,000 g/mol by the known two-phase interface method, by the known method carried out in homogeneous solution (so-called pyridine method) or by the known melt transesterification method by reaction of reactive carbonic acid derivatives with diphenols, aromatic dicarboxylic acid derivatives, chain terminators and, optionally, branching agents, characterized in that phenols corresponding to formula (I) are used as the chain terminators.

The diphenols suitable for use in accordance with the invention may be both mononuclear and also polynuclear and may additionally contain heteroatoms and/or may be additionally substituted, halogen and alkyl, particularly chlorine, bromine, methyl and ethyl, being the preferred substituents.

Diphenols suitable for use in accordance with the invention are preferably those corresponding to formula (II).

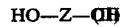

HO—Z—OH in which

Z is difunctional aromatic radical containing 6 to 30 carbon atoms which may be unsubstituted or substituted by halogen, for example chlorine or bromine, or by alkyl, for example methyl or ethyl.

Suitable diphenols are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones, α,α'-bis-(hydroxyphenyl)-diisopropylbenzenes and nucleus-alkylated and nucleus-halogenated compounds thereof. These and other suitable diphenols are described, for example, in U.S. Pat. Nos. 3,028,365, 2,999,835, 3,148,172, 3,271,368, 2,991,273, 3,271,367, 3,280,078, 3,014,891 and 2,999,846, in DE-OSS No. 1 570 703, 2 063 050, 2 036 052, 2 211 956, in FR-P No. 1 561 518 and in H. Schnell's work "Chemistry and Physics of Polycarbonates", Interscience Publishers, New York, 1964.

Preferred diphenols are, for example, 4,4,'-dihydroxydiphenyl, 2,2-bis-(hydroxyphenyl)-propane, 2,4-bis-(4-hydroxyphenyl)-2-methylbutane, 1,1-bis-(4-hydroxyphenyl)-cyclohexane, o,o,-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)sulfone, 2,4-bis-(3,5-dimethyl-4-hydroxyphenyl)-2-methyl-butane,1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane.

Particularly preferred diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane.

Mixtures of the diphenols mentioned above may also be used.

The carbonate precursor may be either a carbonyl halide or a bishaloformate. The carbonyl halides include carbonyl bromide, carbonyl chloride and mixtures thereof. The bishaloformates used include the bishaloformates of dihydric phenols, such as bischloroformates of 2,2-bis-(4-hydroxyphenyl)-propane, 2,2-bis-(4-hydroxy-3,5-dichlorophenyl)-propane and hydroquinone. Carbonyl chloride, also known as phosgene, is preferred.

The dicarboxylic acid derivatives used are dicarboxylic acid dichlorides and dicarboxylic acid dibromides, such as terephthalic acid dichloride, isophthalic acid dichloride or phthalic acid dichloride, and mixtures thereof. Terephthalic acid and isophthalic acid dichloride and mixtures thereof are preferred.

Suitable branching agents are, for example, trifunctional or more than trifunctional carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, used in quantities of from 0.01 to 1.0 mol-% (based on dicarboxylic acid dichlorides used), or trihydric or higher phenols, such as phlorogucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenyl, tetra-(4-hydroxyphenyl)-methane, 2,6-bis-(2-hydroxy-5-methylbenzyl)-4-methylphenyl, 2-(4-hydroxyphenyl)-2-(2,4-dihydroxyphenyl)-propane, tetra-(4-[4-hydroxyphenylisopropyl]-phenoxy)-methane, 1,1-bis-[(4,4''-dihydroxytriphenyl)-methyl]-benzene, used in quantities of from 0.01 to 1.0 mol-% (based on diphenols used). Phenolic branching agents may be initially introduced with the diphenols, acid chloride branching agents may be introduced together with the acid dichlorides.

As mentioned above, the aromatic polyester carbonates or polyesters according to the invention are prepared by known methods. The methods in question are the known two-phase interfacial method, which is described for example by V. V. Korshak and S. V. Vinogradova in "Polyesters", Pergamon Press, 1965, page 448; polycondensation in homogeneous solution (so-called pyridine method), which is described for example in DE-OS 2 714 544 and in the above-cited literature reference, and the known melt transesterification method which is described in DE-AS 1 495 626 or in "Polyesters", Pergamon Press 1965, pages 448 et seq.

The reaction conditions for the production variants suitable in accordance with the invention, i.e. reaction temperatures, reaction pressures, solvents (if any), suitable catalysts, reaction times, the concentrations of the reactants in the solvent used (if any), the quantity of catalyst, the type and quantity of basic compounds, etc., are known and may be applied to the known conditions.

The apparatus used (reaction vessels, stirrers, etc.) are also known.

The polyesters and polyester carbonates according to the invention are preferably prepared by the interfacial method, the following procedure generally being adopted: the diphenols, preferably those corresponding to formula (II), are dissolved in aqueous alkaline phase. The chain terminators of formula (I) required for the preparation of the polyesters and polyester carbonates according to the invention are then added in quantities of 0.5 to 10 mol-% and preferably in quantities of 2 to 7 mol-%, based on the mols diphenols. The dicarboxylic acid derivatives, preferably the corresponding dichlorides, are also added in solution in a suitable solvent.

After addition of an inert organic phase which dissolves polyester or polyester carbonate, the above combination of reactants is reacted with phosgene at 0 to 40.C by the interfacial condensation method where polyester carbonates are to be produced.

The compounds of formula (I) must be readily soluble in the aqueous alkaline medium. In this regard, the compounds of formula (I) show comparable solubility and reactivity to the phenols normally used as terminal groups, such as phenol, p-tert.-butylphenol and p-isooctylphenol. This is all the more surprising insofar as even 2,6-di- tert.-butyl-substituted phenols are insoluble in aqueous alkaline medium (K. Findeisen in Houben-Weyl, "Methoden der organischen Chemie", Vol. 6/1c, pages 1196 et seq., Thieme-Verlag 1976).

In View of the high proportion of 2,4,6-trisubstituted phenols (n>0.5 means more than 50% trisubstituted compounds) in the chain terminator mixture of formula (I), solubility had not been expected. Accordingly, the suitability of the compounds of formula (I) as effective chain terminators for the synthesis of aromatic polyesters and polyester carbonates by the interfacial method was not foreseeable.

The 0.05 to 2 mol-%, based on diphenols used, of branching agents to be optionally used may be initially introduced either with the diphenols themselves and the chain terminators of formula (I) in the aqueous alkaline phase or may be added in solution in an organic solvent before the phosgenation (in the preparation of polyester carbonates).

Instead of the diphenols, it is also possible to use mono- and/or bis-chlorocarbonic esters thereof which are added in solution in organic solvents. In that case, the quantity of chain terminators of formula (I) and of branching agents is determined by the mols of diphenolate structural units, i.e. by the —O—Z—O— structural units where the diphenols of formula (II) are used.

Accordingly, the chain terminators of formula (I) to be used in accordance with the invention may be added before the beginning of or during the reaction. However, enough acid chloride and/or phosgene must be available for them to be able to react and limit the chain. For example, the chain terminator may be used together with the diphenol, may be present in the solution of the chlorides of the aromatic dicarboxylic acids or may be added to the reaction mixture after preparation of a precondensate.

Suitable organic solvents for the solution of the chain terminators of formula (I), the terephthalic acid or isophthalic acid dichlorides and the aromatic polyesters and polyester carbonates are known organic solvents, such as dichloromethane, chloroform, trichloroethylene and tetrachloroethylene, tetrachloroethanes, chlorobenzene, dichlorobenzenes and mixtures of these compounds.

The preparation of the polyesters and polyester carbonates according to the invention by the interfacial method may be catalyzed in the usual way by such catalysts as tertiary amines, particularly tertiary aliphatic amines, such as tributylamine, or triethyleneamine.

The catalysts may be used in quantities of 0.01 to 5 mol-% (based on the diphenols used). The catalysts are added in the usual way for the polycondensation reaction of the aqueous alkaline phase. The aromatic polyesters and polyester carbonates according to the invention may be isolated by the method known from the synthesis of polycarbonates by the two-phase interfacial method. To this end, the organic phase containing the aromatic polyester or the polyester carbonate in solution is separated off, washed and the aromatic polyester or the polyester carbonate subsequently isolated by concentration of the solution by evaporation, an evaporation extruder preferably being used as the final stage of the working-up process.

In the aromatic polyester carbonates, both the ester component and the carbonate component may be present in the form of blocks or statistically distributed polymers. The method of production is also known (cf. for example DE-PS 3 236 382). Compared, for example, with corresponding aromatic polyesters or polyester carbonates terminated with phenol, o-phenylphenol, p-phenylphenol, dimethylphenols, p-isooctylphenol, p-nonylphenol, cresols, halogen phenol or p-tert.-butylphenol, the aromatic polyesters and polyester carbonates according to the invention show distinctly improved flow properties for a comparable average molecular weight.

The polyesters and polyester carbonates according to the invention may be processed as thermoplastics by standard methods at temperatures of 260° C. to 350° C. Moldings, films, fibers and filaments may be produced in known manner by injection molding or extrusion.

The usual additives, such as UV stabilizers, antioxidants and agents against the effect of moisture, flame-proofing agents, processing aids, such as lubricants, mold release agents and plasticizers, and also fillers, such as glass fibers, glass beads, asbestos or carbon fibers, kieselguhr, kaolin, mineral fibers, mineral powder, may be added in known manner to the polyesters and polyester carbonates according to the invention.

In the following Examples, the relative solution viscosity $\eta_{rel}$ was determined in dichloromethane at 25° C. for a concentration of 0.5% by weight.

EXAMPLE 1

2.28 kg bisphenol A (BPA), 1.84 kg 45% by weight aqueous sodium hydroxide, 58 l water and 25 l dichloromethane were introduced under nitrogen into a steel vessel equipped with an intensive stirrer and the mixture stirred until the BPA had completely dissolved.

A solution of 737 g isophthalic acid dichloride and 737 g terephthalic acid chloride and 184.6 g (5 mol-%, based on bisphenol A) of a technical mixture of 2,4-di- and 2,4,6-tri-(1-phenylethyl)-phenol (OH value 150) dissolved in 4.3 kg dichloromethane was then added to the intensively stirred two-phase mixture over a period of 15 minutes while cooling with water, followed by stirring for 1 hour. The temperature of the reaction mixture did not exceed 22° C. The pH value of the mixture was kept at 12 to 13 by addition of sodium hydroxide.

535 g phosgene were introduced with continued stirring, the temperature again being kept at around 20° C. and the pH value at 12 to 13. After the phosgene had been introduced, 14 ml N-ethyl piperidine were added, followed by stirring for 1 hour.

After separation of the aqueous alkaline phase, the organic phase was first washed with dilute phosphoric acid and then with water until it was salt-free and approximately 50% of the dichloromethane distilled off under reduced pressure. The remaining solution was diluted with 15 l chlorobenzene and removal of the dichloromethane by distillation was continued until the sump temperature was approximately 80° C., after which the polyester carbonate was freed from the chlorobenzene in a vacuum extruder at 320° C., drawn off in the form of a strand and granulated. The granulate had a relative solution viscosity $\eta_{rel}$ of 1.271.

EXAMPLE 2

A polyester carbonate was prepared as described in Example 1 using 205.88 g (5 mol-%) of a technical mixture of 2,4-di- and 2,4,6-tri-(1-methyl-1-phenylethyl)-phenol (OH value 136), $\eta_{rel}$=1.304.

EXAMPLE 3

A polyester carbonate was prepared as described in Example 1 using 417.9 g (5 mol-%) of a technical mixture of the 2,4- and 2,4,6-position isomers of the alkylation products of phenol with isobutene and styrene (OH value 67), $\eta_{rel}$=1.299.

COMPARISON EXAMPLES A to C

Polyester carbonates were prepared as described in Example using quantities of 5 mol-% of the following chain terminators:

| Comp. Ex. | Chain terminator | (g) | $\eta_{rel}$ | OHV |
|---|---|---|---|---|
| A | p-tert.-butylphenol | 75 | 1.265 | 373 |
| B | phenol | 47 | 1.268 | 596 |
| C | p-isooctylphenol | 103 | 1.294 | 272 |

EXAMPLE 4

91.2 g bisphenol A are dissolved under nitrogen in 110 g 45% by weight sodium hydroxide and 2800 ml distilled water. 0.645 g (0.4 mol-%, based on bisphenol A) tetrabutyl ammonium bromide are introduced into the resulting solution and 2250 ml dichloromethane subsequently added.

A solution of 40.6 g isophthalic acid dichloride and 40.6 g terephthalic acid dichloride in 250 ml dichloromethane and, at the same time, a solution of 7.46 g (5 mol-%) of a technical mixture of 2,4-di- and 2,4,6-tri-(1-phenylethyl)-phenol (OH value 150) in 250 ml dichloromethane are introduced into this intensively stirred two-phase mixture over a period of 5 minutes while cooling with water at an internal temperature of 20° to 25° C. and at a pH value of 12 to 13. On completion of the addition, the mixture is stirred for 5 minutes. The alkaline aqueous phase is then separated off and the organic phase is washed first with dilute phosphoric acid and then with water until the washing water has a conductivity of $0.1 \cdot 10^{-4}$ S/cm. The polyester is isolated by concentration of the polyester solution by evaporation in a vacuum drying cabinet at 120° C. The material obtained has a relative solution viscosity $\eta_{rel}$ of 1.268.

EXAMPLE 5

An aromatic polyester was prepared as described in Example 4 using 16.72 g (5 mol-%) of a technical mixture of the 2,4- and 2,4,6-position isomers of the alkylation products of phenol with isobutene and styrene (OH value 67), $\eta_{rel}$=1.327.

COMPARISON EXAMPLES D to F

Aromatic polyesters were prepared as described in Example 4 (but with 1.25 times the quantity of reactants and solvents) using quantities of 5 mol-% of the following chain terminators:

| Comp. Ex. | Chain terminator | (g) | $\eta_{rel}$ | OHV |
|---|---|---|---|---|
| D | p-tert.-butylphenol | 3.75 | 1.339 | 373 |
| E | phenol | 2.35 | 1.337 | 596 |
| F | p-isooctylphenol | 5.15 | 1.285 | 272 |

The average molecular weights (Mn) as determined by gel permeation chromatography after preliminary calibration and the melt viscosities ($\eta_{melt}$) as measured with a Contravers Rheomat 30 at 320° C. under a shear stress $\tau$ of $10^3$ Pa are shown in Table 1 for Examples 1 to 5 and Comparison Examples A to F.

| Example | Mn (kg/mol) | $\eta_{melt}$ (Pa · s) |
|---|---|---|
| 1 | 13,387 | 800 |
| 2 | 13,913 | 1100 |
| 3 | 14,807 | 1250 |
| A (Comparison) | 11,164 | 2240 |
| B (Comparison) | 12,408 | 2646 |
| C (Comparison) | 13,249 | 2200 |
| 4 | 9,964 | 3200 |
| 5 | 11,366 | 3350 |
| D (Comparison) | 10,398 | 4100 |
| E (Comparison) | 9,878 | 5180 |
| F (Comparison) | 9,497 | 3900 |

We claim:
1. Thermoplastic aromatic polyester and polyester carbonate having average molecular weights $\overline{M}_n$ (number average, as determined by gel chromgraphy after preliminary calibration) of from 5000 to 100,000 derived from a diphenol, a dicarboxylic acid, chain terminator and, optionally, a branching agent, wherein the chain terminator corresponds to the following formula

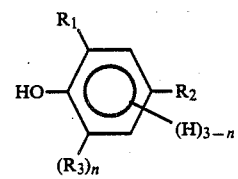

in which $R_1$, $R_2$ and $R_3$ are the same or different and each represents $C_2$–$C_{12}$ alkyl or $C_8$–$C_{20}$ aralkyl and at least one of the substituents $R_1$ or $R_2$ is a $C_8$–$C_{20}$ aralkyl and n has a value of 0.5 to 1.

2. Polyester and polyester carbonate as claimed in claim 1, characterized in that n has a value of 0.6 to 0.9

3. Polyester and polyester carbonate as claimed in claim 1, characterized in that the average molecular weight $\overline{M}_n$ is in the range from 7500 to 25,000.

* * * * *